United States Patent
Farjadrad

(10) Patent No.: US 8,508,252 B2
(45) Date of Patent: Aug. 13, 2013

(54) VARIABLE RESISTOR VOLTAGE DRIVER WITH SELF-NOISE COMPENSATION CIRCUIT

(75) Inventor: Ramin Farjadrad, Los Altos, CA (US)

(73) Assignee: Aquantia Corporation, Milpitas, CA (US)

( * ) Notice: Subject to any disclaimer, the term of this patent is extended or adjusted under 35 U.S.C. 154(b) by 102 days.

(21) Appl. No.: 13/107,659

(22) Filed: May 13, 2011

(65) Prior Publication Data
US 2012/0001661 A1 Jan. 5, 2012

Related U.S. Application Data

(60) Provisional application No. 61/360,606, filed on Jul. 1, 2010.

(51) Int. Cl.
*H03K 17/16* (2006.01)
(52) U.S. Cl.
USPC .......................................................... 326/30
(58) Field of Classification Search
USPC .......................................................... 326/30
See application file for complete search history.

(56) References Cited

U.S. PATENT DOCUMENTS

| | | | | |
|---|---|---|---|---|
| 5,521,528 A * | 5/1996 | Mammano et al. | ............. | 326/30 |
| 7,072,415 B2 * | 7/2006 | Zerbe et al. | ................... | 375/286 |
| 7,221,196 B2 * | 5/2007 | Shirani | .......................... | 327/112 |
| 7,528,629 B2 * | 5/2009 | Farjadrad et al. | ............... | 326/86 |
| 7,675,326 B1 * | 3/2010 | Luo et al. | ........................ | 326/86 |
| 2009/0179666 A1 * | 7/2009 | Chujo et al. | .................... | 326/30 |

* cited by examiner

*Primary Examiner* — Thienvu Tran
(74) *Attorney, Agent, or Firm* — Mahamedi Paradice Kreisman LLP; Lance M. Kreisman

(57) ABSTRACT

A multi-PAM line driver circuit to drive input data along a transmission line from a voltage source is disclosed. The driver circuit includes a voltage source to supply a regulated voltage and a regulator current. A main branch is coupled between the voltage source and the transmission line and includes variable impedance circuitry. The main branch draws a drive current from the voltage source. A compensating branch is coupled to the voltage source in parallel with the main branch and includes a second variable impedance circuit to draw a compensating current from the voltage source based on the drive current, such that a sum of the drive current and the compensating current is substantially constant during the transmission of the input data.

12 Claims, 3 Drawing Sheets

VARIABLE RESISTOR VOLTAGE DRIVER WITH SELF-NOISE COMPENSATION CIRCUIT

CROSS-REFERENCE TO RELATED APPLICATION

This application claims the benefit under 35 USC 119(e) of the co-pending and commonly owned U.S. Provisional Application No. 61/360,606 entitled "Variable Resistor Voltage Driver with Self-Noise Compensation Circuit," filed on Jul. 1, 2010, which is incorporated herein by reference.

TECHNICAL FIELD

The disclosure herein relates to communications, and more particularly to a variable resistor voltage driver with self-noise compensation.

BACKGROUND

In wire-line communications, a transmission line carries electrical signals from a transmitter end to a receiver end. At the transmitter end, the driver circuits feed electrical signals, such as voltage signals, into the transmission line. The driver circuits are commonly known as line drivers. Ideal line drivers transfer the entire signal power generated by the transmitter to the transmission line. In practice, the highest power transfer between the line driver and the transmission line occurs when the output impedance of the line driver matches the characteristic impedance of the transmission line. Also, depending on the circumstances, the line driver may also be required to provide a certain signal voltage level at the input terminals of the transmission line.

In some versions of Ethernet communication, such as Fast Ethernet (100 BASE-T2) or gigabit Ethernet (1000BASE-T), pulse amplitude modulation (PAM) is used to encode message information in the amplitude of a series of signal pulses. Therefore, in PAM, the pulse amplitude represents the actual message data and must be preserved. Line drivers for PAM applications are typically designed for maintaining pulse amplitude variations, while being mindful of impedance matching (between the output impedance of the line driver and the characteristic impedance of the transmission line) and minimizing power consumption by the line driver circuit.

FIG. 1 illustrates a conventional line driver circuit 100 using variable resistors that form a pull-up, pull-down path. Line driver circuit 100 includes a voltage buffer 110, a floating variable resistor $R_M$, respective first and second variable resistors $R_S$, and four switches S1a, S1b, S2a, and S2b. The states or positions of switches S1a, S1b, S2a, and S2b and the values of variable resistor $R_M$ and first and second variable resistor $R_S$ are controlled by driver coder logic 130. Switches S1a and S1b are controlled by the output signal S1 and switches S2a and S2b are controlled by the output signal S2 of driver coder logic 130.

Although conventional line driver circuits often work well for their intended applications, the load current drawn from a power supply is often input-data dependent. The load current is generally at its highest value when an output voltage amplitude (at input terminals of transmission line 120) is at its highest value, and zero when the output voltage amplitude is zero. While this helps to reduce the average power consumption significantly if the data is not just flipping between +1 and −1 (as in a Non Return to Zero 2-level Pulse Amplitude Modulation (NRZ 2-PAM)), for the NRZ N-PAM data streams where N>2, this results in large variation of the current drawn from the power supply, which in turn translates into wide-band supply noise. Moreover, the power supply-rejection ratio (PSRR) of line driver 100 is fairly low (e.g., around 6 dB when terminated by a line having a characteristic impedance equal to the output impedance of liner driver 100). Thus, self-induced high frequency noises as well as other noises and ripples on the power supply may directly contribute to distortion of the output signal provided to transmission line 120.

For sensitive applications (e.g. 10GBase-T), where the link SNR is critical, the quality of the transmitted signal is of utmost value and typically a higher PSRR value (e.g., around 60 dB) is required of the line driver. Thus, the need exists for a line driver that can reduce the data dependency of the current drawn from the power supply, therefore alleviating the disadvantages of the conventional solutions. Embodiments described herein satisfy this need.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

A multi-PAM line driver circuit to drive input data along a transmission line from a voltage source according to one embodiment is disclosed. The driver circuit includes a voltage source to supply a regulated voltage. A main branch is coupled between the voltage source and the transmission line and includes variable impedance circuitry. The main branch draws a drive current from the voltage source. A compensating branch is coupled to the voltage source in parallel with the main branch and includes a second variable impedance circuit to draw a compensating current from the voltage source based on the drive current, such that a sum of the drive current and the compensating current is substantially constant during the transmission of the input data.

Figure 1:
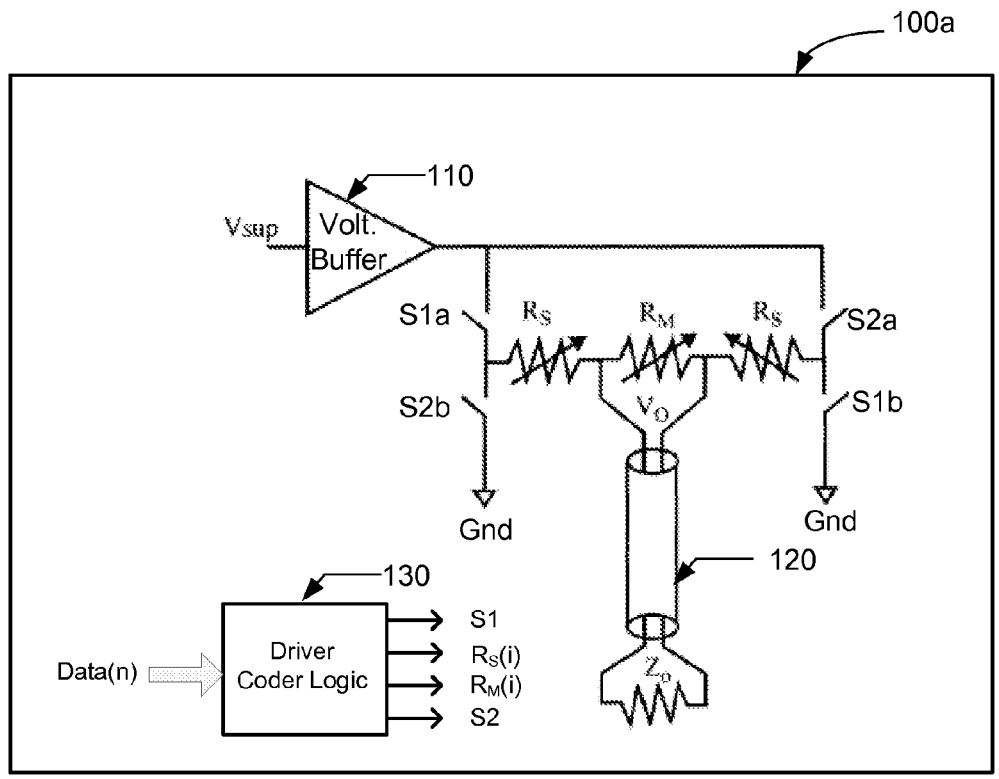
FIG. 1 illustrates a conventional line driver circuit.
Figure 2:
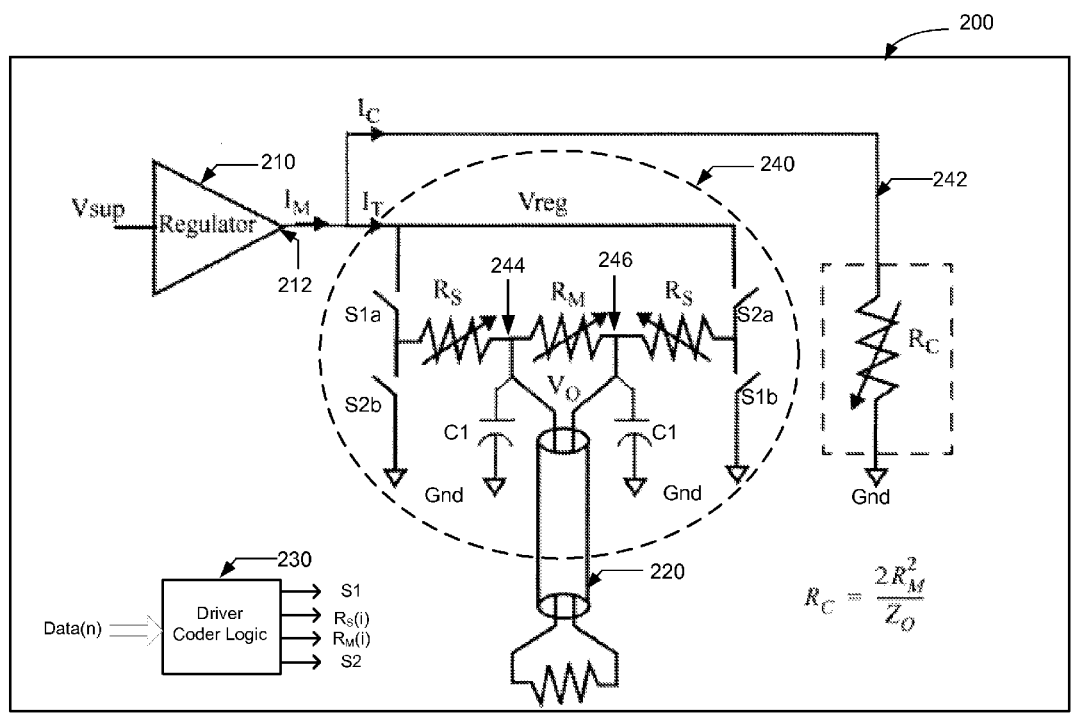
FIG. 2 illustrates a variable resistor line driver circuit including a compensating branch according to an embodiment.

FIG. 2 illustrates a variable resistor line driver circuit 200 for a multi-PAM signaling system according to an embodiment. The line driver circuit 200 includes a main branch 240 and a compensating branch 242. The main branch 240 generally draws a drive current $I_T$ from a voltage regulator 210 while the compensating branch 242 is configured to draw a compensation current $I_C$ from the voltage regulator 210 in such a manner that a sum of the drive current $I_T$ and the compensation current $I_C$ is substantially constant.

Further referring to FIG. 2, the main branch 240 includes a variable floating resistor $R_M$, a first and a second variable resistor $R_S$, and four switches S1a, S1b, S2a, and S2b. The variable resistor $R_M$ is connected between a first terminal 244 and a second terminal 246 of a transmission line 220, which has a characteristic impedance of $Z_0$. The terminals are each capacitively coupled to a reference node, such as a negative power supply rail or ground potential Gnd via respective capacitors C1. The capacitors C1 represent parasitic and terminal pad capacitances associated with the first terminal 244 and the second terminal 246. The variable floating resistor $R_M$ provides an output voltage $V_o$ of the main branch 240 to the transmission line 220. The states of switches S1a, S1b, S2a, and S2b and the values of the variable resistors $R_S$ are controlled by driver coder logic 230. The switches S1a and S1b are controlled by output control signal S1 while the switches S2a and S2b are controlled by output control signal S2. Further details regarding the driver coder logic are disclosed in U.S. Pat. Nos. 7,221,196 and 7,528,629, assigned to the Assignee of the present disclosure and incorporated by reference in their entirety.

A first selectable driving path is formed by the switches S1a and S1b (which are activated to a "closed" state simultaneously by driver coder logic 230, with the switches S2a and S2b simultaneously "opened"), variable floating resistor $R_M$, and first and second variable resistors $R_S$. Switch S1a and first variable resistor $R_S$ are connected in series between an output terminal 212 of regulator 210 and the first terminal 244 of transmission line 220. Second variable resistor $R_S$ and switch S1b are connected in series between the second terminal 246 of transmission line 220 and reference node Gnd.

A second selectable driving path is formed by switches S2a and S2b (which are activated to a "closed" state simultaneously by driver coder logic 230, with switches S1a and S1b simultaneously "opened"), variable resistor $R_M$, and first and second variable resistors $R_S$. Switch S2a and second variable resistor $R_S$ are connected in series between an output terminal 212 of regulator 210 and the second terminal 246 of transmission line 220. First variable resistor $R_S$ and switch S2b are connected in series between the first terminal 244 of transmission line 220 and the reference node Gnd. The purpose of the first and second driving paths is to provide a push-pull driver architecture with minimal components and provide output voltages with different polarities between first terminal 244 and second terminal 246 of transmission line 220.

With further reference to FIG. 2, the compensating branch 242 includes a variable impedance that in one embodiment takes the form of a variable resistor $R_C$. The value of $R_C$ in one embodiment is varied such that the sum of the drive current $I_T$ and the compensation current $I_C$ remains at a constant level even as the main branch resistors (and thus the corresponding drive current) varies. In an impedance matched condition when driver consumes max current, the variable floating resistor $R_M$ is extremely large (open mid branch) and each variable resistor $R_S = Z_0/2$, therefore:

$$I_M = V_{reg}/2Z_0 \quad (1)$$

Where $V_{reg}$ represents the voltage at the output node 212 of the regulator 210. The value of the variable resistor $R_C$ can be determined from:

$$R_C = V_{reg}/I_C \quad (2)$$

Where:

$$I_C = I_M - \frac{V_{reg}}{2R_S + (R_M \| Z_0)} \quad (3)$$

Using equations (1) and (3) and defining the relationship between the values of variable resistors $R_S$ and the variable floating resistor $R_M$:

$$R_S = \frac{R_M Z_0}{2(R_M - Z_0)} \quad (4)$$

one obtains:

$$I_C = \frac{Z_0}{2R_M^2} V_{reg} \quad (5)$$

combining equations (2) and (5) results in:

$$R_C = \frac{2R_M^2}{Z_0} \quad (6)$$

The value of variable resistors $R_C$ may either be computed, coded in a look-up table (LUT), based on equations (6), or simply have a thermometer coding with the variable resistor segments having values that follow the above equation (6). Although the compensating branch 242 alleviates self-induced supply noise problem by cooperating with the main branch in drawing a total constant current from the power supply irrespective of the changes in variable resistors in response to the input data, there are additional loadings in the main branch 240 that need to be addressed. An important part of such loading includes currents drawn by parasitic capacitances of, for example, pads at the output terminals of the line driver (connected to the first and second terminals 244 and 246 of transmission line 220). While the values of the variable resistors $R_S$ and $R_M$ are controlled by driver coder logic 230, the value of the variable resistor $R_C$ to compensate for the variable values of the resistors $R_S$ and $R_M$ should be either computed or coded in a look-up table, based on equation (6). The additional loadings are taken into account in the embodiment shown in FIG. 3 and discussed below.

Figure 3:
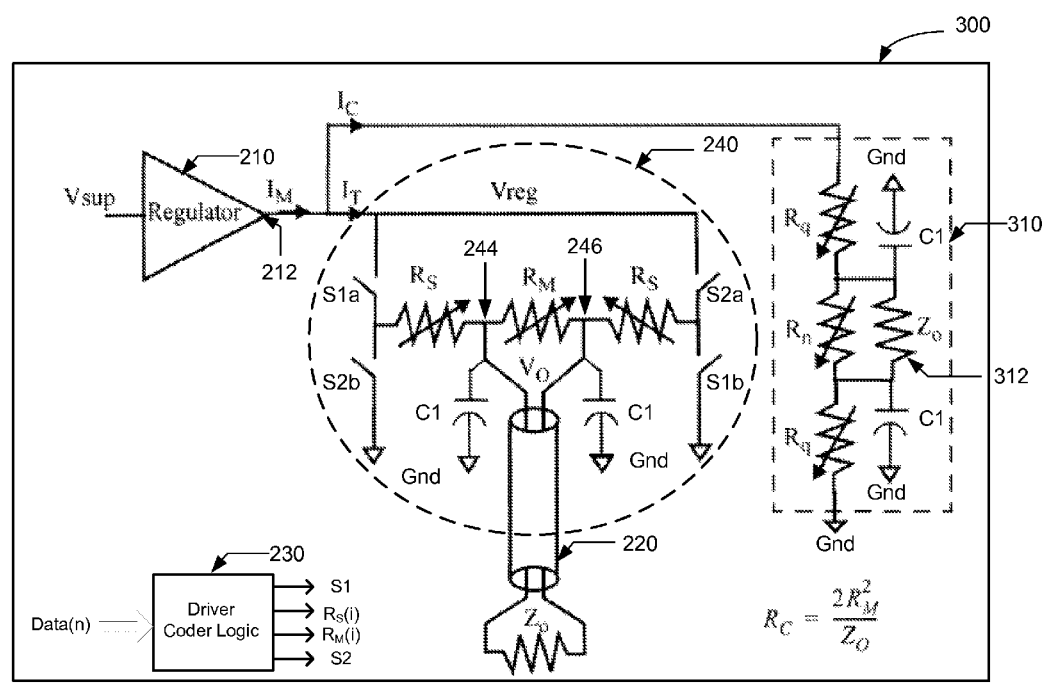
FIG. 3 illustrates an embodiment of the variable resistor line driver circuit of FIG. 2.

FIG. 3 illustrates an embodiment of a variable resistor line driver, generally designated 300. The line driver 300 includes similar features as the previously described line driver 200 (FIG. 2), but employs an alternative structure for the compensating branch 310. The configuration of the compensating branch 310 optimizes the profile of the line-driver current (i.e., $I_M$) at higher frequencies, where the effect of parasitic capacitances needs to be taken into account. In one specific embodiment, the topology of the compensating branch 310 replicates the topology of a main branch 240 during operation (i.e., one set of switches S1a and S1b or S2a and S2b are in conducting states). The compensating branch 310 includes a variable resistor $R_n$, first and second variable resistors $R_q$, a resistor representing a characteristic impedance $Z_0$, and capacitances $C_1$. The first and second variable resistors $R_q$ are connected in series with the variable resistor $R_n$ between an output node 212 of a regulator 210 and a ground node Gnd. The resistor $Z_0$ is connected in parallel with variable resistor $R_n$ and the capacitances C1 are connected between terminals of resistor $Z_0$ and the ground node Gnd.

In determining the values of the variable resistors $R_q$ and variable resistor $R_n$ two conditions are considered. First, the relation between $R_n$ and $R_q$ should be the same as the relation (4) between $R_M$ and $R_S$ of the previous embodiment, respectively. Second, the equivalent resistance of the compensating branch 310 should be equal to the variable resistor value $R_C$ described in the previous embodiment. Therefore, one can write:

$$R_q = \frac{R_n Z_0}{2(R_n - Z_0)} \quad (7)$$

and

-continued $$R_C = \frac{2R_M^2}{Z_0} = 2R_q + (R_n \| Z_0) \quad (8)$$

Combining equations (7) and (8), one finds:

$$R_n = \frac{R_M Z_0}{\sqrt{R_M^2 - Z_0^2}} \quad (9)$$

$$R_q = \frac{R_M Z_0}{2\left(R_M - \sqrt{R_M^2 - Z_0^2}\right)} \quad (10)$$

While the values of variable resistors $R_S$ and $R_M$ are controlled by driver coder logic 230, the value of variable resistors $R_n$ and $R_q$ may either be computed, coded in a look-up table (LUT), based on equations (9) and (10), or simply have a thermometer coding with the variable resistor segments having values that follow the above equations.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A multi-PAM line driver circuit to drive multi-PAM input data along a transmission line, the driver circuit comprising:
    a voltage source to supply a regulated voltage;
    a main branch having a first segment coupled between the voltage source and the transmission line, the first segment including a first variable impedance circuit, the main branch having a second segment coupled between a ground node and the transmission line and including a second variable impedance circuit, the main branch drawing a consumed drive current from the voltage source; and
    a compensating branch coupled to the voltage source in parallel with the main branch and including a third variable impedance circuit to draw a consumed compensating current from the voltage source based on the consumed drive current, such that a sum of the consumed drive current and the consumed compensating current through the voltage source is substantially constant during the transmission of the multi-PAM input data.

2. The driver circuit according to claim 1 wherein the main branch further includes:
    a floating variable resistor connected to first and second terminals that are coupled between the first and second segments.

3. The driver circuit according to claim 2 wherein the compensating branch couples the voltage source to the ground node.

4. The driver circuit according to claim 2 wherein the second variable impedance circuit exhibits an impedance value that is a function of a characteristic impedance of the transmission line and a value of the floating variable resistor.

5. The driver circuit according to claim 4 further comprising a look-up table to store at least one value of the second variable impedance circuit, the value based on the characteristic impedance of the transmission line and the value of the floating variable resistor.

6. The driver circuit according to claim 1 wherein the compensating branch is a replica of the main branch.

7. The driver circuit according to claim 2 further comprising coder logic configured to define values of each of the floating variable resistor and the first and second variable impedance circuits based on the multi-PAM input data.

8. The driver circuit according to claim 1 wherein the voltage source includes a voltage regulator coupled to a power supply.

9. A method comprising:

driving multi-PAM input data along a transmission line by supplying consumed drive current along a main branch between a voltage source and a reference node, the main branch having a first segment coupled between the voltage source and the transmission line and including a first variable impedance circuit, the main branch further including a second segment coupled between the reference node and the transmission line and including a second variable impedance circuit; and supplying consumed auxiliary current along an auxiliary compensating branch coupled in parallel with the main branch, wherein a sum of the consumed drive and auxiliary currents through the voltage source is substantially constant.

10. The method of claim 9 wherein supplying consumed drive current along the main branch further includes:

coupling a floating variable resistor between the first and second segments.

11. The method of claim 10 further comprising configuring coder logic to define values of each of the floating variable resistor and the first and second variable impedance circuits based on multi-PAM input data.

12. The method of claim 9 wherein supplying consumed auxiliary current along the auxiliary compensating branch comprises setting a value of a variable resistor based on a value of a characteristic impedance of the transmission line and a value of a floating variable resistor, and drawing the consumed-auxiliary current through the variable resistor.

* * * * *